United States Patent [19]
Blake

[11] 3,770,232
[45] Nov. 6, 1973

[54] SHOCK AND VIBRATION ISOLATION MOUNT
[75] Inventor: John Calvin Blake, Cincinnati, Ohio
[73] Assignee: General Electric Company, Lynn, Mass.
[22] Filed: Apr. 4, 1972
[21] Appl. No.: 240,998

[52] U.S. Cl................. 248/21, 248/358 R, 267/136
[51] Int. Cl............................................. F16f 15/00
[58] Field of Search .................... 248/21, 15, 9, 20, 248/24, 8, 358 R, 358 AA; 188/113; 267/136, 151

[56] References Cited
UNITED STATES PATENTS
3,429,545  2/1969  Michel ............................ 248/358 R
2,660,387  11/1953  Roy ....................................... 248/21
1,543,769  6/1925  Hewlett et al................. 248/358 AA
3,572,621  3/1971  Whitten ............................... 248/20

FOREIGN PATENTS OR APPLICATIONS
1,079,675  12/1954  France ................................. 248/15
715,796  9/1954  Great Britain .................. 248/358 R Primary Examiner—J. Franklin Foss
Attorney—Edward S. Roman et al.

[57]  ABSTRACT

A shock and vibration isolation mount includes a resilient elastomeric portion coupled in shock attenuating series with a stacked plurality of dished, disc-shaped annular metal springs. Normal low level vibration is attenuated by the resilient elastomeric portion acting alone, whereas high intensity shocks of sufficient magnitude to compress the resilient elastomeric portion to a substantially incompressible form of near infinite spring constant are continually attenuated by the stacked metal springs.

3 Claims, 1 Drawing Figure

PATENTED NOV 6 1973
3,770,232
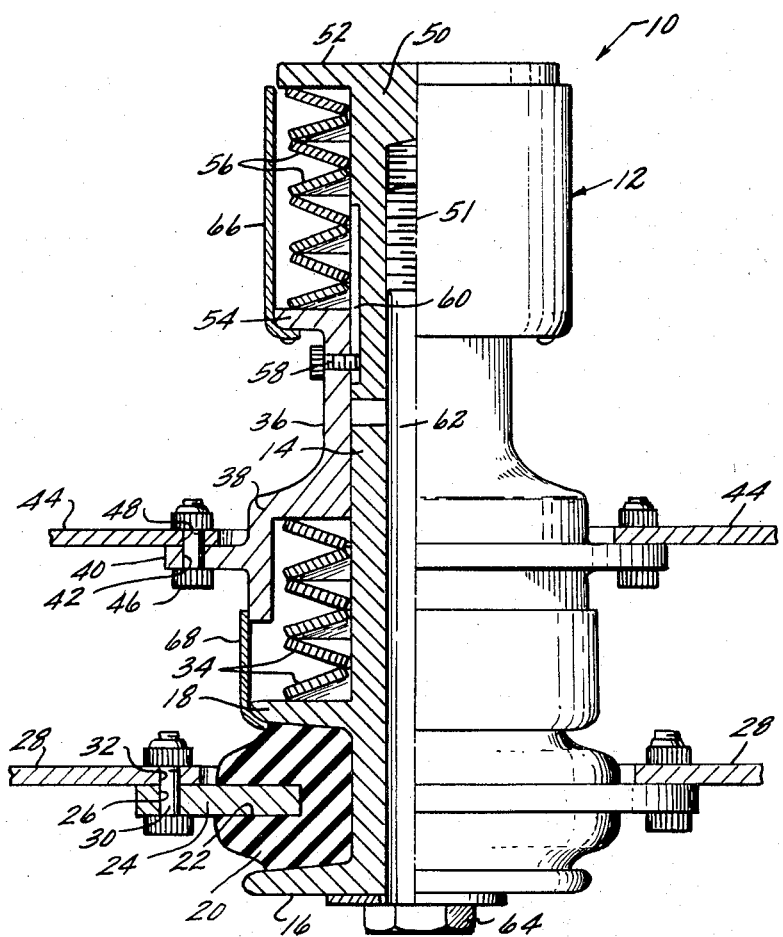

SHOCK AND VIBRATION ISOLATION MOUNT

BACKGROUND OF THE INVENTION

In general, this invention relates to a shock and vibration isolation mount, and more particularly to a shock and vibration isolation mount having a resilient elastomeric portion in series with a plurality of dished, disc-shaped annular metal springs which are stacked so as to provide attenuation of high intensity shock waves.

Recently, marine gas turbines utilizing aircraft jet engine hardware have been utilized for ship propulsion units. These marine gas turbines on shipboard, and especially on naval vessels, are generally not capable of withstanding the high intensity shock loads resulting from explosions, direct hits and near misses. Therefore, it is important that marine gas turbines and similar structures be supported on mountings which are capable of isolating the structures from such high intensity shocks.

When a vessel is subjected to an underwater explosion, the initial shock wave from the explosion will strike the hull structure and impart a high velocity to it within a few milliseconds. The forces of an underwater explosion will generally move water in a direction normal to the surface interface whereas water motion in the other directions will be limited by the density of the surrounding water.

A surface vessel travels at the interface between the water and atmosphere, and therefore the acceleration of the hull structure from an underwater explosion will generally be in a direction normal to the surface of the water. Gas turbine engines and other structural members of the vessel respond to this basic motion and produce their own reaction forces which frequently amplify acceleration loads as the mass and elasticities of gas turbines and their bases are relatively lighter when compared to the vessel as a whole. These accelerations may result in damage to the gas turbines and other equipment. However, such damage can be minimized by interposing between the vessel and the item to be protected, a shock and vibration absorbing mount which will not transmit damaging features of the shock motions.

Conventional types of resilient rubber mounts which have been provided to attenuate vessel-born noise are not particularly well adapted to act as shock attenuators because they are inherently soft mounts with a low spring constant at low loads, rapidly changing to an incompressible mount with an infinite spring constant at higher loads. Therefore, such mounts under shock conditions generally incur what is quite commonly referred to as "hard bottoming" which results in transmission of the high shock loads to the gas turbine engine and its related equipment.

Attempts to utilize material other than rubber in shock mounts have not met particular success. Most of these attempts have utilized helical springs which have inherent linear load deflection characteristics and, therefore, cannot prevent "hard bottoming," and also do not supply an appreciable amount of damping. A variable pitch helical spring can provide nonlinearity, and therefore overcome one objection to use of the helical spring; however, the lack of damping will still remain. Also, a helical spring having a sufficiently low natural frequency to provide for shock isolation, and still retain the capability to store the required energy, would of necessity be unduly large and heavy.

Therefore, it is a primary object of this invention to provide a shock and vibration mount of reduced size for attenuating both vessel born noise and vibration together with the high intensity shock loads resulting from underwater explosions.

It is also an object of this invention to provide a shock and vibration mount wherein the incremental deflection is variable as a function of shock load so that high intensity shock loads are increasingly attenuated with a high degree of damping to assure a soft bottoming.

SUMMARY OF THE INVENTION

The shock and vibration isolating mount of this invention must first include means for attaching the mount to a supporting structure. The mount further includes a plurality of dished, disc-shaped annular metal springs stacked to peripherally engage each other along alternating inside and outside edges. The metal spring stack is arranged in series with an elastomeric shock and vibration damping means disposed intermediate the attaching means and one end of the stacked metal springs. Means for providing connection from the other end of the stacked metal springs to the object to be isolated from shock and vibration, are also provided.

DESCRIPTION OF THE DRAWINGS

While the specification concludes with claims distinctly claiming and particularly pointing out the invention described herein, it is believed that the invention will be more readily understood by reference to the discussion below and the accompanying drawing in which:

The FIGURE is a side elevational view, partly in cross-section, of the shock and vibration isolation mount of this invention.

DESCRIPTION OF THE PREFERRED EMBODIMENT

The shock and vibration mount of this invention is shown generally in the drawing at 10 as comprising a casing 12. Disposed within the casing 12 is a hollow rod 14 having a first peripheral flange 16 extending laterally at its lower end. A second peripheral flange 18 extends laterally from the rod 14 at a location spaced apart from the first flange 16. A resilient elastomeric annulus or grommet 20 is disposed intermediate the flanges 16, 18 so as to simultaneously engage the opposing faces of the first and second flanges. The annulus 20 is preferably composed of rubber, and includes a groove 22 around the outer periphery thereof. A flat ring 24 is imbedded within the groove 22 and includes a plurality of circumferentially spaced holes 26 disposed around the periphery thereof to provide means for attachment of the shock and vibration isolator 10 to a rigid support, a portion of which is shown at 28. The isolating mount 10 is secured to the rigid support 28 by bolts 30 which pass through aligned openings 32 in the support 28 and holes 26 in the flat ring 24.

The overlying surface of the flange 18 accommodates a plurality of dished or coned, disc-shaped annular metal springs 34 vertically stacked to peripherally engage each other along alternating inside and outside edges. The dished or coned metal springs 34 are more generally known as "Belleville" springs. A sleeve 36 is translatably disposed around the hollow rod 14 for engagement with the top of the stacked metal springs 34. The lower portion of the sleeve 36 defines a cup at 38, the cavity of which receives and maintains the stacked metal springs 34 in substantial vertical alignment. The outer surface of the cupped portion of the sleeve 36 is formed integral to a peripheral flange 40 extending laterally therearound. The flange 40 includes a plurality of circumferentially spaced holes 42 disposed around the periphery thereof to provide means of attachment of the shock and vibration isolator 10 to a platform, a portion of which is shown at 44. The platform 44 supports the object to be isolated from shock and vibration, such as a gas turbine engine which is not shown in the drawing. The isolator 10 is secured to the platform 44 by bolts 46 which pass through aligned openings 48 in the platform 44 and holes 42 in the flange 40.

A second hollow rod 50 is maintained in vertical coaxial alignment with rod 14 and remains disposed for vertical translation with respect to sleeve 36. Rod 50 includes an integral peripheral flange 52 extending laterally at its upper end. The upper end of sleeve 36 also includes an integral peripheral flange 54 extending laterally therearound. Intermediate the flanges 52, 54 is disposed a second plurality of dished or coned, disc-shaped annular metal springs 56 which are also vertically stacked to peripherally engage each other along alternating inside and outside edges in the same manner as previously described in relation to springs 34. Anti-rotation means are provided for the hollow rod 50 by a plurality of circumferentially spaced guide bolts, one of which is shown at 58. The guide bolts extend through and are threadably engaged by the sleeve 36 so as to ride within a plurality of circumferentially spaced apart vertical guide grooves disposed in the side of the hollow rod 50, one of which is shown at 60. An elongated shank 62 extends through the hollow rod 14 and threadably engages the hollow rod 50 at 51. The shank 62 is formed integral to a bolt head 64 which engages the underside of the rod 14 upon threading of the shank 62 within the rod 50. Shell casings 66 and 68 are provided to cover the stacked metal springs 56 and 34 respectively.

In normal operation the shock and vibration mount of this invention operates as a passive device such that steady state vibrations generated through the normal operation and maneuver of the vessel are attenuated by the resilient rubber annulus 20 while the stacked metal springs remain substantially rigid. However, under high intensity shock conditions such as are precipitated by underwater explosions, the disc-shaped metal springs 34 become active and compress, limiting the overall spring rate to a satisfactory soft value instead of the infinite spring constant that would result from the resilient rubber annulus acting alone. Impingement of a high intensity shock wave upon the hull structure of a vessel would initially effect a rapid acceleration of the rigid support 28 in a vertically upward direction. Rapid acceleration of the rigid structure 28 correspondingly effects an acceleration of the flat ring 24 which is fixedly attached thereto. The resilient rubber annulus 20 rapidly compresses in the area directly between the flat ring 24 and the peripheral flange 18 changing the rubber from an initially low spring constant to an infinite spring constant in only a matter of a few milliseconds. At that instant, the rubber annulus 20 becomes substantially incompressible in the area directly between the flat ring 24 and the peripheral flange 18, so that further acceleration of the flat ring 24 is imparted directly to the flange 18. Acceleration of the flange 18 then operates to compress the disc-shaped metal springs 34 further dampening the high intensity shock transmitted to the platform 44 through sleeve 36. The disc-shaped metal springs have a variable incremental deflection which is a function of shock loading, so that high shock loads are increasingly attenuated with a high degree of damping to assure soft bottoming. Also, it is readily apparent that the disc-shaped metal springs have a sufficiently high initial spring constant so as not to deflect until after the spring constant of the rubber annulus 20 becomes substantially infinite.

Although not immediately apparent, the shock and vibration mount of this invention must also include the ability to attenuate the shock rebound which is manifest as a rapid deceleration of the hull structure in the upward direction followed immediately by a rapid acceleration of the hull structure in the downward direction. Again rapid upward deceleration and downward acceleration of the rigid structure 28 causes a corresponding deceleration and acceleration of the flat ring 24 which is fixedly attached thereto. The resilient rubber annulus 20 rapidly compresses in the area directly intermediate the flat ring 24 and the peripheral flange 16 changing the rubber from an initially low spring constant to an infinite spring constant. At that instant the rubber grommet 20 becomes substantially incompressible in the area directly between the flat ring 24 and the peripheral flange 16 so that further downward acceleration of the flat ring 24 is imparted directly to the flange 16. Downward acceleration of the flange 16 then operates to compress the disc-shaped metal springs 56 through the combined downward motion of the engaging bolt head 64, shank 62, rod 50, and integral flange 52 all of which translate downward together as a single unit. Again the variable deflection of the metal springs operates to continuously attenuate the high intensity shock loads to assure soft bottoming. If the resilient rubber annulus were non-symmetrical with respect to the flat ring 24 the two stacks of disc-shaped metal springs 34, 56 wouuld have to be individually tailored in order to obtain similar load/deflection characteristics for both the initial shock direction and the rebound direction. Precise tailoring may not be necessary, however, because the initial shock and rebound deflection curves are generally different.

The stacked disc-shaped metal springs 34, 56 arranged in series with the resilient rubber annulus permit a wide variety of load versus deflection performances so that shock loads can be attenuated for a range of conditions and to a predetermined degree. Under high intensity shock conditions, high loads and large displacements, the stacked disc-shaped metal springs 34, 56 become effective in limiting the overall spring rate to a soft value rather than the hard spring rate that would result from the rubber mounts alone. The high degree of damping, together with the high attenuation of accelerating forces supplied by the shock and vibration mounts of the invention, will reduce the moment and shear loads imposed on the marine turbine engine and associated equipment mounted thereon. Also, the high damping will require less space for the engine due to the smaller deflections of the platform that will occur under shock conditions.

While a preferred embodiment of the present invention has been depicted and described, it will be appreciated by those skilled in the art that many modifications, substitutions and changes may be made thereto without departing from the invention's fundamental theme.

Having thus described one embodiment of the invention, what is desired to be secured by letters patent is as follows:

1. A shock and vibration isolating mount comprising: elongated rod means;

a first plurality of disked, disc-shaped annular metal springs attached to peripherally engage each other along alternating inside and outside edges around the rod means;

an elastomeric shock and vibration damping annulus disposed around the rod means in fixed connection therewith and in longitudinal spaced connection to one end of the stacked metal springs;

a sleeve translatably disposed around the first rod means with one end in engaging relation to the other end of the first metal spring stack;

means for fixedly attaching the elastomeric annulus to a supporting structure;

means for fixedly connecting the sleeve to a component to be isolated from shock; and a second plurality of disked, disc-shaped annular metal springs stacked to peripherally engage each other along alternate inside and outside edges around the rod means wherein one end of the second spring stack is in longitudinally spaced connection to the other end of the sleeve with the other end of the second spring stack restrained against expansion by the rod means such that rapid acceleration of the supporting structure in one linear direction operates to first compress that portion of the elastomeric annulus disposed intermediate the attaching means and the first spring stack and then to compress the first spring stack while rapid acceleration of the supporting structure in the opposing linear direction operates to first compress that portion of the elastomeric annulus disposed in shock attenuating series with the second spring stack and then to compress the second spring stack thereby attenuating shock and vibration to the connecting means caused by rapid accelerations of the supporting strucuture.

2. The shock and vibration mount of Claim 1 wherein:

the rod means includes a first rod having first and second spaced apart flanges extending laterally therearound with the second flange spaced intermediate the longitudinal extremities of the first rod wherein the elastomeric annulus is disposed around the first rod intermediate the spaced apart flanges;

the first metal spring stack is disposed around the first rod in longitudinally spaced relation to the annulus so as to engage that side of the second flange opposing the annulus;

the attaching means includes a ring embedded within a groove around the annulus;

the rod means further includes a second rod in longitudinally spaced relation to the first rod and having a third peripheral flange extending laterally therearound;

the second metal spring stack is disposed around the second rod intermediate the sleeve and third flange;

and there is included an elongated shank through the first hollow rod and threadably engaged to the second rod and having a head at the outside end thereof for engagement with the end of the first hollow rod.

3. The shock and vibration mount of claim 2 wherein:

the elastomeric annulus is rubber;

the flat ring attaching means includes a plurality of holes around the periphery thereof for attachment to a supporting structure;

the sleeve connecting means includes a peripheral flange extending laterally therearound and having a plurality of holes around the periphery thereof for connection to an object requiring shock and vibration isolation, and anti-rotation means are provided to prevent rotation of the sleeve relative to the second rod.

* * * * *